Aug. 22, 1950     E. E. LOVING     2,519,386
AIRCRAFT SAFETY DOOR
Filed Dec. 28, 1945
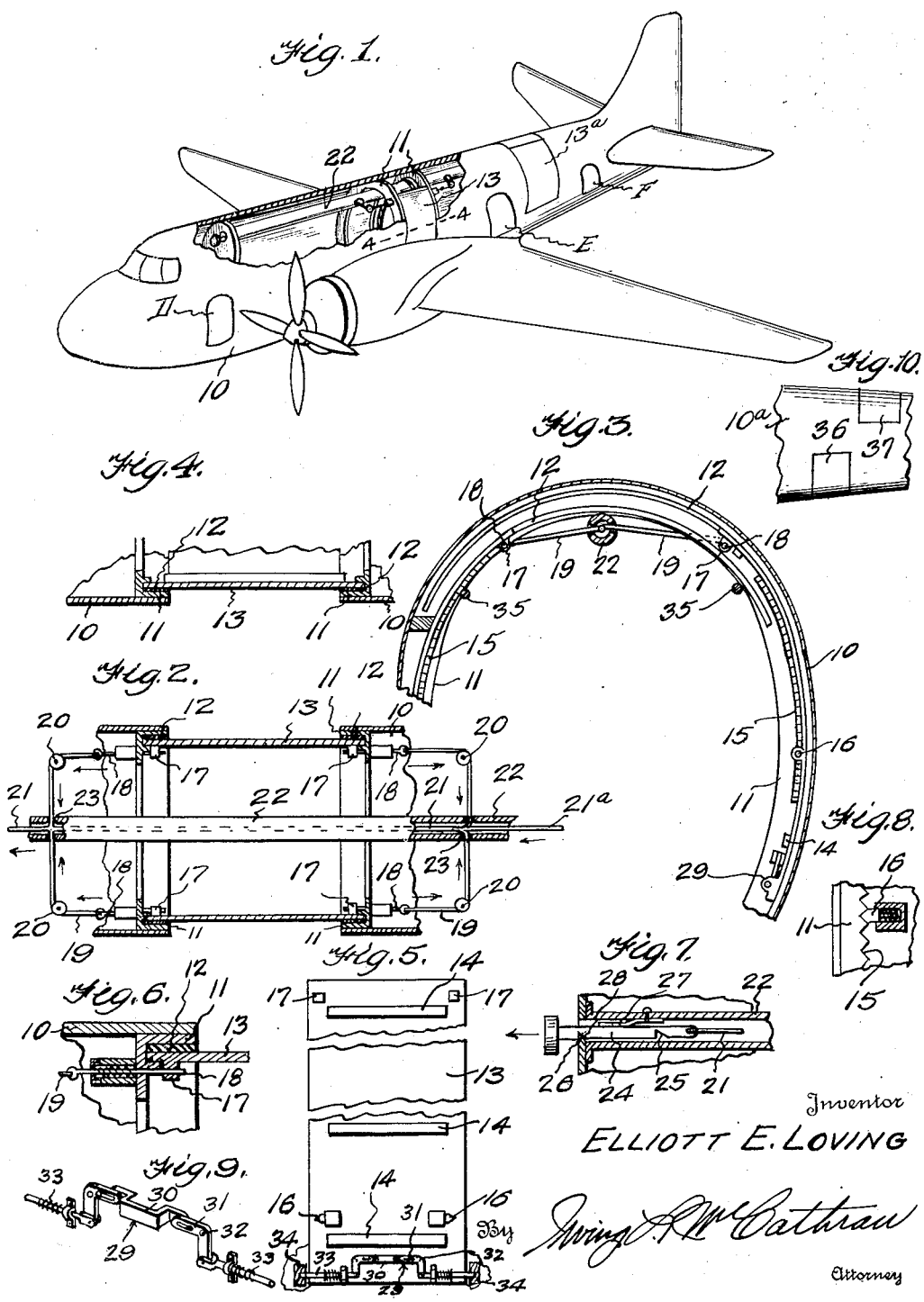
Inventor
ELLIOTT E. LOVING Patented Aug. 22, 1950

2,519,386

UNITED STATES PATENT OFFICE 2,519,386

AIRCRAFT SAFETY DOOR

Elliott E. Loving, Memphis, Tenn.

Application December 28, 1945, Serial No. 637,623

2 Claims. (Cl. 244—129)

This invention relates to an aircraft safety door and has for one of its objects the production of a simple and efficient means for providing an emergency exit which may be easily controlled to provide an escape for the occupants of an aircraft and the like, in an emergency, whether in the air or after a forced landing.

A further object of this invention is the production of a simple and efficient means for releasing or unlocking the safety escape doors of an aircraft and the like, from a remote location adjacent the forward cabin of the aircraft.

Other objects and advantages of this invention will appear throughout the following specification and claims.

In the drawing:

Figure 1 is a perspective view of an airplane partly broken away to illustrate the location and lock-control operating mechanism of the escape doors;

Figure 2 is a fragmentary horizontal sectional view of the airplane illustrating the door lock-control mechanism;

Figure 3 is an enlarged fragmentary vertical sectional view through the body of the airplane, illustrating the mounting and relative locations of the doors on opposite sides of the airplane;

Figure 4 is an enlarged transverse sectional view taken on line 4—4 of Figure 1;

Figure 5 is a plan view of the inner face of one of the doors;

Figure 6 is an enlarged transverse sectional view through one of the door guide rails and illustrating one of the locking bolts;

Figure 7 is an enlarged longitudinal sectional view of the pull-latch mechanism for remotely operating the door-releasing and locking mechanism;

Figure 8 is an enlarged fragmentary side view of one of the spring-pressed safety latches, showing the latch engaging the safety rack, the casing of the latch being shown in section;

Figure 9 is a perspective view of the bottom manually operated lock mechanism carried by each safety door;

Figure 10 is a fragmentary top plan view of an airplane illustrating a modified arrangement of safety doors, wherein the doors are arranged upon opposite sides thereof and in staggered relation.

By referring to the drawing, it will be seen that 10 designates an airplane fuselage or body portion having a plurality of door frames constituting door guide rails 11. Each door frame 11 is provided with a channel upon each side thereof defining a trackway 12 and a flexible steel door 13 is slidably mounted in the trackways 12. Each flexible door 13 is reinforced transversely by means of the transverse ribs or cleats 14. These cleats 14 are arranged in spaced relation upon the inner face of the door to permit the door to flex throughout its length and follow in the channels of the trackways 12 while the door is being raised. These trackways approximately follow the curved transverse contour of the fuselage 10 of the aircraft, as shown in Figure 3. A toothed rack 15 is located at the edge of each channel or trackway 12. Each rack 15 is engaged by the tapering end of a spring-pressed plunger 16 located at each side of the door 13 to provide a means to hold the door in a selected raised position and at the same time permit the door to be raised and lowered. These plungers 16 are carried by the inner faces of the doors 13.

A locking bolt-receiving socket member 17 is carried near the upper end and at opposite sides of each door 13, as shown in Figures 2 and 5, for receiving the locking bolts 18. These locking bolts 18 are carried at opposite sides of each door frame 11 and are spring-pressed to normally engage the socket members 17 and lock the doors 13 in a closed position. Pull cables 19 are secured to the bolts 18 and these cables 19 pass over pulleys 20 suspended in any suitable manner from the top of the fuselage of the aircraft. The cables 19 are connected to a master cable 21 which passes longitudinally through the encasement tube 22, which tube extends longitudinally of the aircraft near the top thereof, as shown in Figure 1. The cables 19 pass through suitable openings 23 formed in the sides of the tube 22. A series of doors 13 may be provided and arranged as shown in Figure 1 with one door upon each side of the fuselage adjacent the wings and a pair of similar rear doors 13ª adjacent the tail of the aircraft to provide convenient exits at different locations and thereby prevent congestion at one point in the event of accident. A locking device similar to the bolts 18 and socket members 17 may be employed for locking the rear doors 13ª, which bolts 18 may be operated from the extension 21ª of the cable 21. This mechanism may be multiplied to provide numerous door-control or locking mechanisms without departing from the spirit of the invention.

The master cable 21 is connected to a pull latch 24 which extends inwardly of the forward end of the encasement tube 22, as shown in Figure 7. This latch 24 is provided with a notch 25 upon its under face which is adapted to be engaged by the tooth 26 at the forward end of the tube 22 when the latch 24 is pulled forwardly in the direction of the arrow shown in Figure 7. A spring 27 engages the latch 24 to hold the latch 24 in a selected position. The latch 24 is provided with a notch 28 near its forward end to anchor the latch 24 in a set position when the latch is in a normal position and the bolts 18 are in a locking position. When the latch 24 is pulled forwardly and the notch 25 engages the tooth 26, the bolts 18 will be drawn to a releasing position to permit the doors 13 and 13a to be opened.

The individual doors may be individually unlocked in an emergency if desired, merely by an attendant or steward pulling upon the overhead cables 19 upon opposite sides of the doorway of the door which is to be unlocked.

Each door is preferably provided with a lift release locking mechanism 29 carried at the bottom of each door such as is shown upon door 13, in Figure 5. This lift release comprises a handle 30 which is pivotally and slidably connected at its opposite ends to the bell crank levers 31. These levers 31 are pivotally secured to the door 13 at 32, and engage the spring-pressed withdrawing bolts 33 which normally engage the keepers 34 at opposite sides of the door frames 11 and near the bottom of each frame. A rod 35 is located transversely of the top of each doorway to which rod the release for the rip-cord of a parachute is adapted to be attached should the occupants be required to bail out while the aircraft is in flight, thereby providing an automatic rip-cord release.

In Figure 10 there is shown a modified form of the invention wherein the exit doors 36 and 37 are arranged upon opposite sides of and in staggered relation upon the fuselage 10a of the aircraft.

The present invention is especially adapted for use upon aircraft such as airplanes and the like, and relates particularly to a safety exit door which is carried by the fuslage and is normally held in a locked or closed position. The doors are adapted to be unlocked by pulling the latch member 24, which latch member 24 releases all of the locks 18 of all of the safety doors simultaneously or these doors may be individually released or unlocked, as described above by an attendant pulling upon the cables 19. The latch 24 may be released by the pilot and preferably the co-pilot would take one of the two forward doors 13 and a steward would take one of the rear doors. The doors may be raised after they are unlocked by the operator grasping the lift release locking mechanism 29, and the doors being flexible they easily slide upwardly within guide channels or trackways. The spring-pressed plunger 16 will slide over the racks 15 and hold the doors in a selected raised position. It is preferable that the doors be arranged on the top of the fuselage in the manner illustrated.

It of course is obvious that an axe or other implement may be placed in a convenient and secret location where it may be available to members of the crew.

The safety doors 13 and 13a may be used as doorways for loading and unloading the plane if desired, but are preferably used only in emergencies and other doors D, E and F of the conventional type may be provided.

It should be understood that certain detail changes may be employed so long as such changes fall within the scope of the appended claims.

Having described the invention, what is claimed as new is:

1. In an aircraft construction, a body portion having a doorway, a door normally closing said doorway, locking means engaging the door to hold the door in a selected position, flexible elements extending longitudinally of the body portion and engaging the locking means for actuating the locking means, an encasement tube receiving the flexible elements for a major portion of their length and extending longitudinally of the body portion to shield the flexible elements and hold the same out of the path of occupants of the aircraft, and portions of the flexible elements extending outside of the encasement tube adjacent the doorway to facilitate the gripping of the flexible elements adjacent the doorway by an attendant to release the locking means for the door.

2. In an aircraft construction, a body portion having a doorway, a door normally closing said doorway, locking means engaging the door to hold the door in a selected position, flexible elements extending longitudinally of the body portion and engaging the locking means for actuating the locking means, an encasement tube receiving the flexible elements for a major portion of their length and extending longitudinally of the body portion to shield the flexible elements and hold the same out of the path of occupants of the aircraft, portions of the flexible elements extending outside of the encasement tube adjacent the doorway to facilitate the gripping of the flexible elements adjacent the doorway by an attendant to release the locking means for the door, a pull latch slidably mounted in one end of the tube and connected to all of the flexible elements to facilitate the release of the locking means from a point remote from the door, and means for holding said pull latch in a set selected position.

ELLIOTT E. LOVING.

REFERENCES CITED

The following references are of record in the file of this patent:

UNITED STATES PATENTS

| Number | Name | Date |
|---|---|---|
| 25,487 | Chittenden | Sept. 20, 1859 |
| 892,970 | Bagby | July 7, 1908 |
| 1,492,180 | Pitrone | Apr. 29, 1924 |
| 2,257,103 | Brokering | Sept. 30, 1941 |
| 2,338,950 | Linke et al. | Jan. 11, 1944 |
| 2,378,856 | Laddon et al. | June 19, 1945 |

FOREIGN PATENTS

| Number | Country | Date |
|---|---|---|
| 419,539 | Great Britain | Nov. 14, 1934 |
| 700,857 | France | Jan. 2, 1931 |